(No Model.)  R. H. LAYTON.  2 Sheets—Sheet 1.
WAGON BRAKE.
No. 574,809.  Patented Jan. 5, 1897.
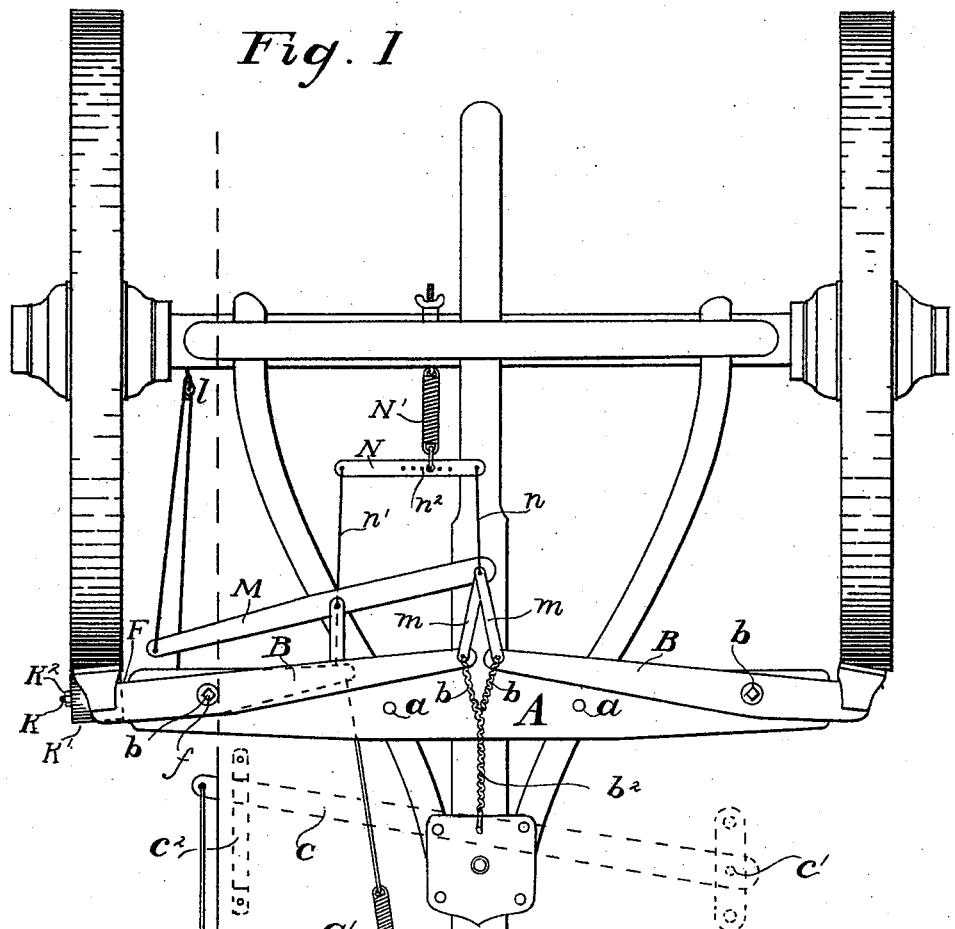
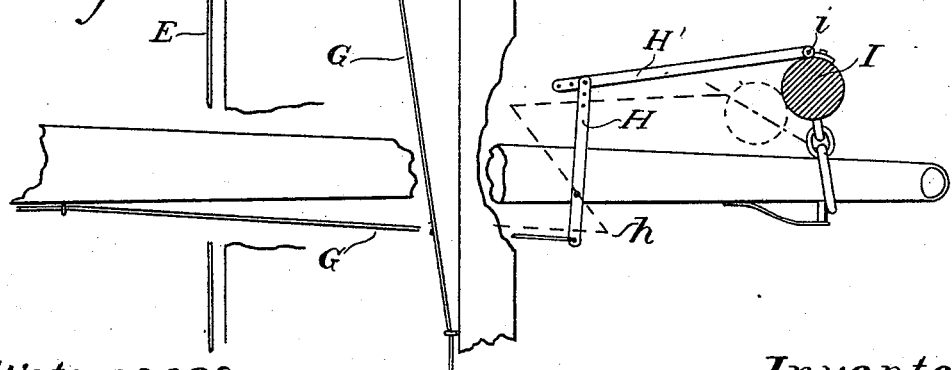
Witnesses  Inventor
  Rawson H. Layton
By his Atty.

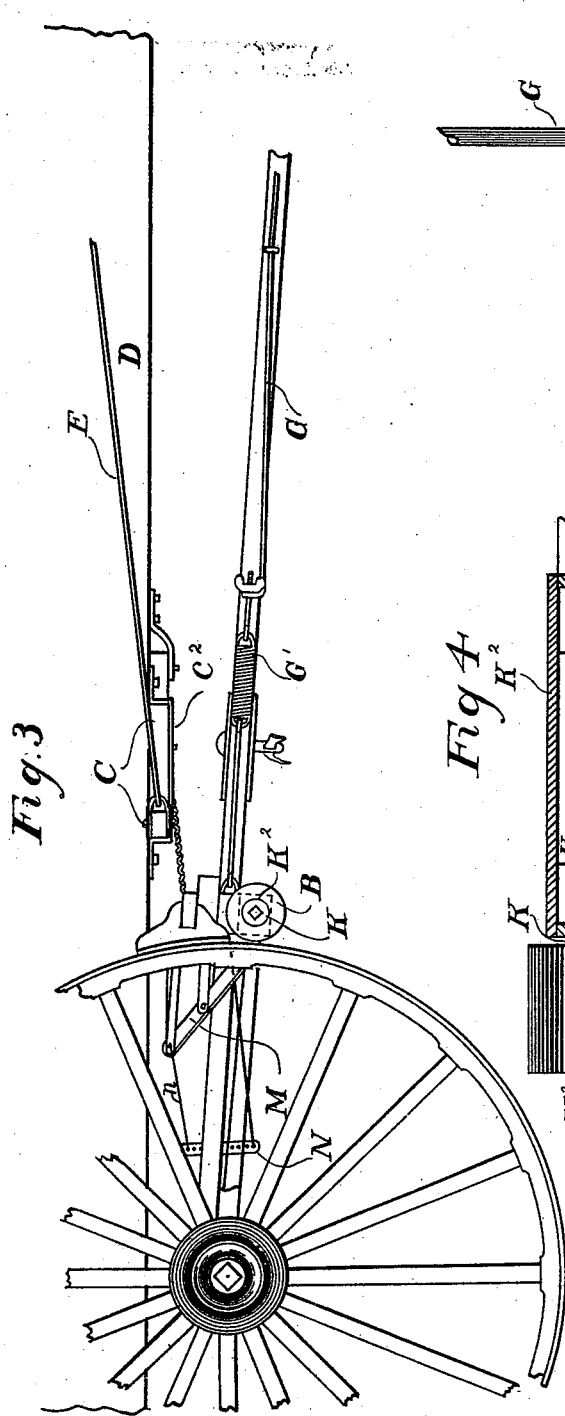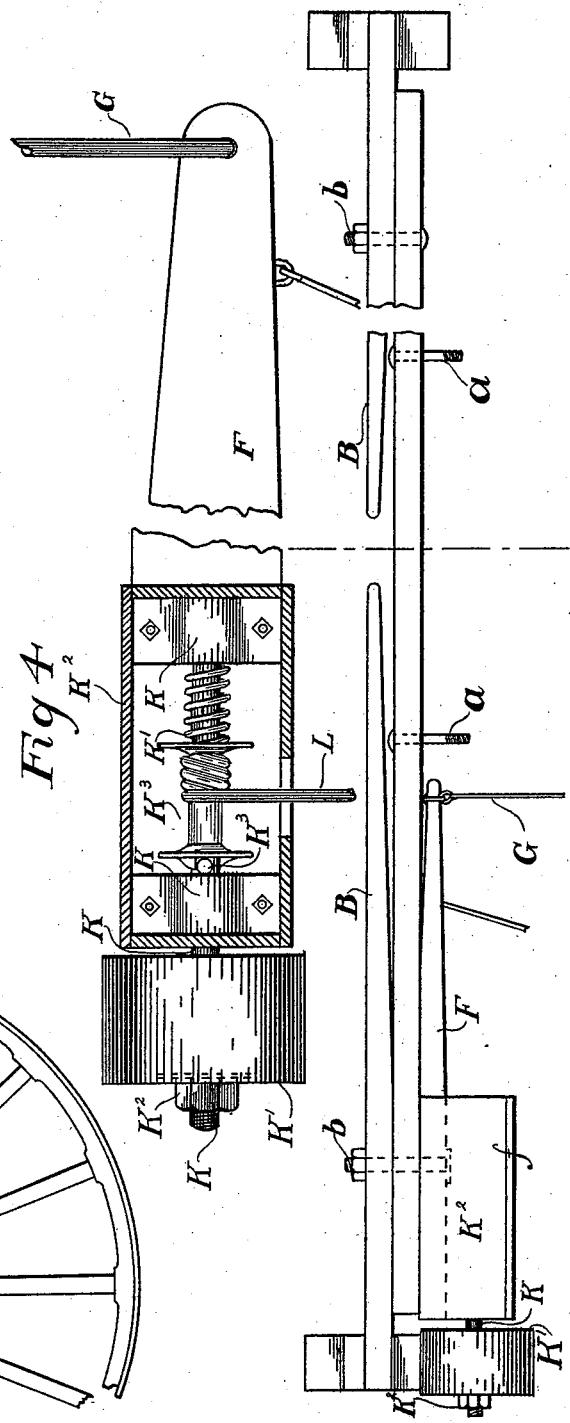

UNITED STATES PATENT OFFICE.

RAWSON H. LAYTON, OF SOUTH BEND, INDIANA.

WAGON-BRAKE.

SPECIFICATION forming part of Letters Patent No. 574,809, dated January 5, 1897.

Application filed August 31, 1896. Serial No. 604,434. (No model.)

*To all whom it may concern:*

Be it known that I, RAWSON H. LAYTON, a citizen of the United States, residing at South Bend, in the county of St. Joseph and State of Indiana, have invented certain new and useful Improvements in a Combination Hand and Automatic Wagon-Brake, of which the following is a specification.

My invention relates to a wagon-brake which may be operated either or both by manual power or by the horses pulling back upon the neck-yoke.

The object of my invention is mainly to provide an automatic brake which will respond quickly to the back action upon the neck-yoke, and which may be connected to a brake-lever operated either by hand or foot power to give either additional brake action or independent brake action, and which will also serve to throw off both the direct and the automatic-brake levers.

A further object of my invention is to provide an automatic brake which may be applied to the wheels without interfering with the movement of the wagon in backing, and also to provide a simple combination-brake which will act effectively under all requirements on wagons of various kinds, as will hereinafter appear.

In the accompanying drawings, which illustrate my invention, Figure 1 is a plan view of the rear end and hind wheels of the running-gear of a wagon with my improved brake attached; Fig. 2, a side elevation of the forward end of the tongue with the neck-yoke in section and the brake connections applied thereto, the dot lines representing the said yoke and brake connections in a second or operating position; Fig. 3, a side elevation of the parts shown in Fig. 1 with the rear wheel broken away; Fig. 4, an enlarged inverted view of the automatic-brake lever broken away in the middle and with the brake-roller gear-box in section; and Fig. 5, a front elevation of the cross-bar brake-levers and some of their connections, the said cross-bar and one of the brake-levers being broken away at one end.

The cross-bar A, carrying the several brake-levers, is securely bolted at $a$ to the rear hounds of a wagon as ordinarily constructed. The brake-levers B, which may be operated in the ordinary manner, are in this instance bolted at $b$ to the outer ends of the cross-bar A, and at their inner ends are connected by links $b'$ $b'$ and chain $b^2$ with a draw-lever C (shown by dot lines in Fig. 1 and by full lines in Fig. 3) and pivotally connected at one end $c'$ to the box or body D of the wagon, the other end of said lever being held within a guide-strap $c^2$ at the opposite side of the wagon-body and connected to a brake-rod E, which is operated by a hand or foot lever in any well-known or preferred manner.

An automatic-brake lever F is pivotally supported to and upon the under side of the cross-bar A at $f$, and is connected to a rod G, which extends along the tongue to the forward end thereof and is there connected to the lower end of a lever H, pivoted at $h$ to the tongue and connected at its upper end by a bar H' with a staple $i$ upon the upper side of a neck-yoke I, which latter is connected to the tongue in any preferred manner which will admit of its rolling back upon the tongue, as shown by dot lines in Fig. 2 of the drawings. A spring tension-link G' is interposed at the rear end of rod G to admit of adjustment and relieve the rod of complete rigidity in action, and the upper end of the lever H is provided with a number of holes to allow the bar H' to be be adjusted thereon and thus regulate the throw of the lever.

The outer end of the automatic-brake lever F is provided with bearings $k$ $k$, which support the shaft K of a brake-roller K', which latter is securely held from turning upon the shaft by a thread and nut $K^2$ thereon, and a ratchet-spool $K^3$ upon the shaft K is connected at its inner end with a spiral spring $k'$ upon the said shaft K, the said spring being secured at its other end to the inner bearing $k$ of the brake-roller shaft.

A box $k^2$ covers the shaft K and its connection inside the brake-roller, and a chain L, secured to and wound upon the ratchet-spool $K^3$ by the action of the spring $k'$, passes through a slot in the box $k^2$ to a pulley $l$ upon the axle, and thence forward to a lever M, supported upon the cross-bar A and connected with the hand-brake levers, as hereinafter described, to give rotation to the ratchet-spool $K^3$, and thence by a pin $k^3$ on the shaft K to the brake-roller K', which action of said roller, being in a direction opposite to that of the forward movement of the wagon-wheel against which it bears, as shown in Fig. 3, will materially aid in arresting the said forward movement of the wheel. The spool-ratchet will, however, allow the free backward rotation of the said brake-roller and wheel, as shown in Fig. 4, and not materially interfere with the backing of the wagon when the automatic brake is on.

The inner end of the lever M is connected by links $m$ $m$ with the inner ends of the two direct or hand-brake levers B, and when they are thrown on the chain L is slackened and the ratchet-spool $K^3$ is turned back by the spiral spring $k'$ to rewind the chain upon the ratchet-spool in readiness for further operation.

The inner end of lever M and the links $m$ $m$ are connected by a rod $n$ and equalizing-lever N, adjustably secured by a spring-link N' to the rear axle and by a rod $n'$ at the opposite end of lever N to the inner end of the automatic-brake lever F, by means of which the automatic and the direct or ordinary brake mechanism are connected.

When both brakes are thrown on, it will be seen that the spring-link N' is under tension and the lever N is connected by holes $n^2$ adjustably therewith to allow of sufficient movement of said equalizing-lever N and its connections with the automatic lever F to throw the latter as well as the hand-lever-brake levers out of work when the pull upon the latter is released by the ordinary lever mechanism.

A brake thus constructed will meet all requirements and is adapted to be applied to wagons of all kinds, whether a box-body is used or not, as a simple cross-bar is all that need be connected to the running-gear, the draw-bar of the hand-brake being connected thereto by a bracket, if desired.

I claim as my invention and desire to secure by Letters Patent—

1. The combination with the running-gear of a wagon, of a cross-bar secured thereto, a hand-brake lever and an automatic-brake lever pivoted thereto at one end thereof, a rod connecting the said automatic-brake lever with a lever pivoted to the forward end of the pole, a link and yoke also supported at the forward end of the pole and connected together, substantially as described.

2. A combination hand and automatic brake, comprising the running-gear of a wagon, a cross-bar secured thereto, brake-levers pivoted thereto at each end thereof and hand-lever mechanism connected therewith, an automatic-brake lever also pivoted to said cross-bar upon the opposite side thereof, and connected to the neck-yoke, and an equalizing-lever connected with the running-gear and with the said automatic and direct brake levers, substantially as described.

3. An automatic brake, comprising the running-gear of a wagon, a brake-lever connected at one end to the neck-yoke and provided at its opposite end with a roller, a ratchet-spool and chain connecting the same with a hand-lever mechanism, substantially as described.

4. In a combined automatic and hand brake, the combination with the running-gear of a wagon, of a cross-bar, brake-levers pivoted thereto and connected at their inner ends to a hand-brake mechanism, an automatic-brake lever pivoted to said cross-bar and connected to the yoke at the forward end of the tongue, and an equalizing-gear comprising a lever, rods connecting the lever with the said brake-levers and a spring-link connecting the equalizing-lever with the running-gear or rear axle, substantially as described.

5. In a combined automatic and hand brake, the combination with the wagon-gear, of the hand and automatic levers, a brake-roller or the automatic lever, a ratchet-spool, a chain connecting the end of the automatic lever, a lever pivoted to the running-gear connected to said chain and also connected to the inner ends of the hand-brake levers, substantially as described.

In testimony that I claim the foregoing as my invention I have signed my name in the presence of two subscribing witnesses.

RAWSON H. LAYTON.

Witnesses:
B. KRUEPER,
C. H. ZABELE.